(12) United States Patent
Luken

(10) Patent No.: US 8,590,504 B2
(45) Date of Patent: Nov. 26, 2013

(54) METHOD FOR CONTROLLING AN INTAKE SYSTEM

(75) Inventor: Todd R. Luken, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 999 days.

(21) Appl. No.: 12/463,091

(22) Filed: May 8, 2009

(65) Prior Publication Data
US 2010/0282202 A1    Nov. 11, 2010

(51) Int. Cl.
    *F02D 13/06* (2006.01)
(52) U.S. Cl.
    USPC ............ 123/198 F; 123/184.53; 123/184.55; 123/184.59
(58) Field of Classification Search
    USPC ....... 123/198 F, 184.53, 184.55, 184.56, 481; 701/112
    See application file for complete search history.

(56) References Cited

U.S. PATENT DOCUMENTS

| | | | |
|---|---|---|---|
| 4,124,012 A | 11/1978 | Fuller, Jr. | |
| 4,331,113 A | 5/1982 | Tadokoro et al. | |
| 4,502,435 A * | 3/1985 | Tadokoro et al. | 123/198 F |
| 4,556,026 A | 12/1985 | Masuda et al. | |
| 6,161,733 A | 12/2000 | King | |
| 6,895,941 B2 | 5/2005 | Matthews et al. | |
| 6,922,986 B2 * | 8/2005 | Rozario | 60/284 |
| 6,922,997 B1 | 8/2005 | Larson et al. | |
| 7,188,468 B2 * | 3/2007 | Fukusako et al. | 60/285 |
| 7,472,014 B1 * | 12/2008 | Albertson et al. | 701/103 |
| 7,516,730 B2 * | 4/2009 | Ukai et al. | 123/198 F |
| 2002/0023615 A1 * | 2/2002 | Dreymuller et al. | 123/198 F |
| 2005/0045156 A1 * | 3/2005 | Yokoi et al. | 123/481 |
| 2005/0049108 A1 * | 3/2005 | Nishizawa et al. | 477/37 |
| 2006/0196178 A1 | 9/2006 | Caine et al. | |
| 2008/0029058 A1 * | 2/2008 | Duesmann et al. | 123/198 F |
| 2008/0216788 A1 * | 9/2008 | Henrich et al. | 123/184.56 |

FOREIGN PATENT DOCUMENTS

| | | |
|---|---|---|
| JP | 59077057 | 5/1984 |
| JP | 59126050 | 7/1984 |
| JP | 60150411 | 8/1985 |
| JP | 63005132 | 1/1988 |
| JP | 63094031 | 4/1988 |
| WO | WO 2007/009624 A1 * | 1/2007 |

* cited by examiner

*Primary Examiner* — Noah Kamen
*Assistant Examiner* — Grant Moubry
(74) *Attorney, Agent, or Firm* — Plumsea Law Group, LLC; Mark E. Duell

(57) ABSTRACT

A method and a system for controlling an intake system for an engine is disclosed. The method includes steps for selecting an intake mode according to the current engine speed and the current cylinder mode. The method may be used for controlling an intake system in conjunction with a multi-displacement engine having one or more cylinders that may be deactivated.

20 Claims, 7 Drawing Sheets

METHOD FOR CONTROLLING AN INTAKE SYSTEM

BACKGROUND

The present invention relates to motor vehicles and in particular to a method for controlling an intake system in engines with cylinder deactivation.

Methods for controlling various systems associated with cylinder deactivation have been previously disclosed. Caine et al. (U.S. patent number 2006/0196178) teaches an internal combustion engine with cylinder disablement and a method for controlling engine exhaust flow into an exhaust emission after-treatment device following cylinder disablement. The after-treatment device could be a catalytic converter, for example. The Caine design is intended to prevent fresh air from being pumped into the after-treatment device (catalytic converter) during a deactivated cylinder mode, which may prevent the after-treatment device from functioning properly.

Caine teaches an engine with a set of cylinders that may be deactivated. The exhaust from this deactivated set of cylinders may be reintroduced back into the intake stream, by way of a recirculation conduit, or the exhaust may travel through an exhaust conduit into an after treatment device, such as a catalytic converter. In the Caine design, a pair of butterfly valves controls the flow of exhaust into either the recirculation conduit or the exhaust conduit. When the cylinders are deactivated, the butterfly valves are configured to block exhaust from those deactivated cylinders from entering the exhaust conduit; and instead, send those uncombusted gases to a recirculation conduit, which then in turn, reintroduces those uncombusted gases to the air supply system.

Tadokoro et al. (U.S. Pat. No. 4,331,113) teaches a device for selective combustion in a multi-cylinder engine. Tadokoro teaches two intake passages that lead to two cylinders of an engine. The first intake passage includes a shutter valve that may open and close to control the flow of air through the first intake passage and into the first cylinder. In other words, Tadokoro teaches a shutter valve that closes to prevent combustible air from entering the first cylinder, thus providing a means for cylinder deactivation. Tadokoro does not teach the use of variable intake runner lengths, much less the concept of predefining prohibited operating ranges of a shutter valve associated with an intake runner to prevent noise, vibration and harshness.

The prior art has several shortcomings. There is no teaching in the prior art of controlling an intake system in conjunction with a multi-displacement engine having one or more cylinders that may be deactivated. There is a need in the art for a system and method that addresses the problems of the prior art.

SUMMARY

A method for controlling intake runner length is disclosed. Generally, these methods can be used in connection with an engine of a motor vehicle. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy, for example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a method for controlling an intake system in a motor vehicle comprising the steps of: determining a current cylinder mode; receiving information related to a parameter associated with an operating condition of the motor vehicle; selecting a predetermined range associated with the current cylinder mode, the predetermined range being a range of values associated with the parameter; comparing the parameter with the predetermined range, the predetermined range having a lower limit and an upper limit; and using a first intake mode when the parameter is within the predetermined range and using a second intake mode when the parameter is outside the predetermined range.

In another aspect, the parameter is engine speed.

In another aspect, the first intake mode is tuned for a first set of resonances.

In another aspect, the second intake mode is tuned for a second set of resonances.

In another aspect, the first intake mode is associated with a first effective intake runner length that is less than a second effective intake runner length associated with the second intake mode.

In another aspect, the predetermined range includes all engine speeds.

In another aspect, the predetermined range includes no engine speeds.

In another aspect, an ECU switches between the first intake mode and the second intake mode by opening and closing a valve.

In another aspect, the invention provides a method for controlling an intake system in a motor vehicle comprising the steps of: determining a current cylinder mode; receiving information related to a parameter associated with an operating condition of the motor vehicle; and selecting an intake mode for the intake system according to the current cylinder mode and the value of the parameter.

In another aspect, the parameter is engine speed.

In another aspect, the intake system includes a plurality of intake modes.

In another aspect, the intake system includes a set of continuously varying intake modes.

In another aspect, each intake mode from the set of continuously varying intake modes is associated with a distinct intake runner length.

In another aspect, the invention provides a method for an intake system in a motor vehicle comprising the steps of: determining a current cylinder mode, wherein the cylinder mode is related to the number of deactivated cylinders; and using the current cylinder mode to determine an intake mode associated with the intake system.

In another aspect, there are three cylinder modes.

In another aspect, the intake system includes a first intake mode and a second intake mode.

In another aspect, the first intake mode is associated with a first effective intake runner length.

In another aspect, the second intake mode is associated with a second effective intake runner length.

In another aspect, the first effective intake runner length is shorter than the second effective intake runner length.

In another aspect, the first intake mode or the second intake mode are selected in order to achieve increased volumetric efficiency (also referred to herein as "volume efficiency") within an engine associated with the motor vehicle.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
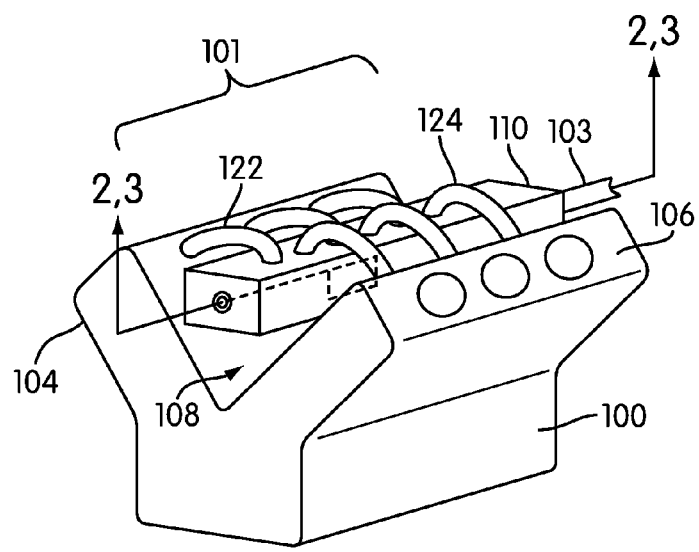
FIG. 1 is an isometric schematic view of an exemplary embodiment of a six cylinder engine.

FIG. 1 is a schematic view of an exemplary embodiment of engine 100. Engine 100 may be associated with a motor vehicle of some kind. For the purposes of clarity, engine 100 is illustrated as a V6 engine in the following embodiments, however it should be understood that in other embodiments, engine 100 could include other numbers of cylinders as well.

In some embodiments, engine 100 includes first cylinder bank 104 and second cylinder bank 106. First cylinder bank 104 and second cylinder bank 106 may each comprise three cylinders. Although they are not depicted in FIG. 1, each of the cylinders comprising cylinder banks 104 and 106 may be further associated with fuel injectors, pistons, cam heads, as well as other components that are necessary for the functioning of engine 100.

Engine 100 may also include intake system 101. In this embodiment, intake system 101 may be disposed between first cylinder bank 104 and second cylinder bank 106. In particular, in the current embodiment, intake system 101 may be disposed within V-shaped portion 108 of engine 100. In this embodiment, intake system 101 may have a length that is comparable to the length of engine 100. In other words intake system 101 may run along a majority of V-shaped portion 108.

In some embodiments, intake system 101 is configured to receive air from intake line 103 downstream of a throttle body and distribute that air to the cylinders comprising cylinder bank 104 and cylinder bank 106. In some embodiments, intake system 101 includes resonance chamber 110 and first pipe set 122 and second pipe set 124. In an exemplary embodiment, air received from a throttle body is transported to resonance chamber 110 and then further distributed to cylinder banks 104 and 106 via first pipe set 122 and second pipe set 124. Pipe sets 122 and 124 may comprise distributor pipes that are configured to deliver air from resonance chamber 110 to cylinder banks 104 and 106. In an exemplary embodiment, first pipe set 122 and second pipe set 124 are associated with first cylinder bank 104 and second cylinder bank 106, respectively. Furthermore, the number of pipes comprising each pipe set 122 and 124 may be equal to the number of cylinders associated with cylinder banks 104 and 106. In this embodiment, pipe sets 122 and 124 each comprise three distributor pipes.

Figure 2:
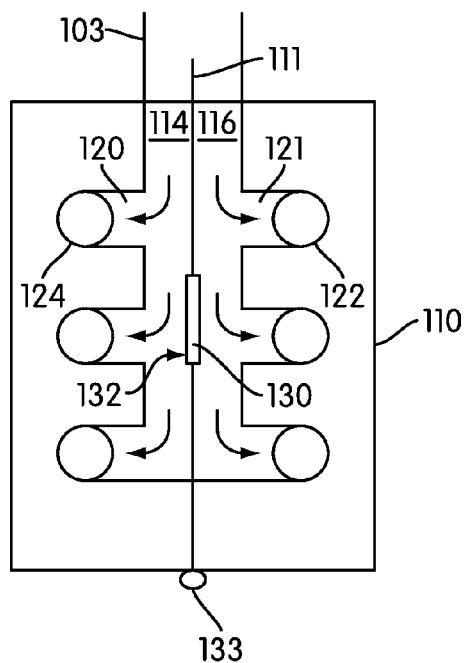
FIG. 2 is a top down view of an exemplary embodiment of an intake system.
Figure 3:
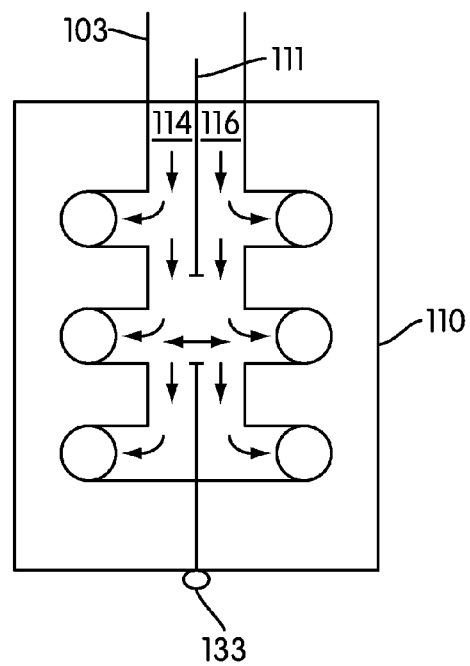
FIG. 3 is a top down view of an exemplary embodiment of an intake system.

FIGS. 2 and 3 are top down schematic views of an exemplary embodiment of resonance chamber 110 of intake system 101. In this embodiment, intake system 101 includes central wall 111 that is configured to separate resonance chamber 110 into left cavity 114 and right cavity 116. As shown in FIG. 2, incoming air proceeding from intake line 103 is split and flows equally through left cavity 114 and right cavity 116. Air moving through left cavity 114 then moves to left resonance channels 120 that are further associated with second pipe set 124. Likewise, air moving through right cavity 116 moves through right resonance channels 121 that are further associated with first pipe set 122.

It should be understood that central wall 111 dividing left cavity 114 and right cavity 116 need not be disposed vertically with respect to resonance chamber 110. Generally, central wall 111 may be disposed in any direction. In an exemplary embodiment, central wall 111 is disposed diagonally. With this arrangement, the cross sections of cavities 114 and 116 are not rectangular, but rather triangular.

In this embodiment, only the very bottom of pipe sets 122 and 124 are seen in cross section, as pipe sets 122 and 124 are configured to rise up and over resonance chamber 110, as seen in FIG. 1. Furthermore, because of the shape of pipe sets 122 and 124, air moving through left resonance channels 120 is transported to second cylinder bank 106, even though second cylinder bank 106 is on the right side of engine 100. Also, air moving through right resonance channels 122 is transported to first cylinder bank 104, even though first cylinder bank 104 is on the left side of engine 100.

In many cases, an intake system may be 'tuned' to provide increased volume efficiency, as is known in the art. Typically, the intake system may be constructed to have just the right length so that pressure waves formed inside the intake system may arrive at the intake valve just as it is opening. This pressure wave generally acts to increase the amount of air taken into the cylinder, thus increasing the volume efficiency of the engine. Because this 'tuning' of the intake system may occur for very narrow speed ranges of the engine, it is often beneficial to use an intake system that may be 'tuned' for both low speed ranges and high speed ranges.

Different methods for modifying an intake system to increase volume efficiency at both high and low speeds have been previously disclosed. U.S. Pat. Nos. 6,591,804 and 6,382,162, the entirety of both being included here by reference, teach methods that include modifying the length of distribution pipes. The exemplary embodiment discussed in this detailed description and shown in the Figures refers to an intake system as discussed in U.S. Pat. No. 5,056,473, the entirety of which is included here by reference. The details of this method for modifying an intake system will now be discussed.

In this exemplary embodiment, intake system 101 includes valve 130, associated with opening 132 of central wall 111. In a closed position, shown in FIG. 2, valve 130 may be configured to prevent any air from passing through opening 132, between left cavity 114 and right cavity 116. In an open position, shown in FIG. 3, valve 130 may put left cavity 114 and right cavity 116 in fluid communication, allowing for air to be exchanged. In this embodiment, the physical lengths associated with intake system 101 have not been modified. However, by allowing air to now circulate between left cavity 114 and right cavity 116, the resonance properties of intake system 101 have been modified. In other words, the physical lengths associated with intake system 101 have been effectively increased as air can now travel over greater distances through both left cavity 114 and right cavity 116. In this case, when valve 130 is closed, intake system 101 is configured for increased volume efficiency at low engine speeds. Likewise, when valve 130 is open, intake system 101 is configured for increased volume efficiency at high engine speeds. In other words, this method of modifying the flow of air through resonance chamber 110 allows for a similar effect as would be achieved by adding length to the distribution pipes, as is achieved using other methods, such as are employed by dual intake runner systems.

In this exemplary embodiment, valve 130 is a shutter valve controlled by solenoid 133. In other embodiments, however, valve 130 may be any type of valve including, but not limited to, butterfly valves, rotating valves, as well as other types of valves. Valve 130 may be controlled by other means besides a solenoid in some embodiments. In some embodiments, valve 130 may be a valve with an 'open' and 'closed' position.

It should be understood that in other embodiments, a different type of intake system could be implemented, including any intake system known in the art. Throughout the remainder of this detailed description, the term 'intake mode' may be used to refer to a particular configuration of an intake system that is tuned for particular resonances of pressure waves at particular speeds. Achieving two or more intake modes using the same intake system could be accomplished, for example, by directly changing the intake runner lengths of the intake system, or by effectively changing the runner lengths in the manner described above by using a valve to change the airflow within the intake system.

Figure 4:
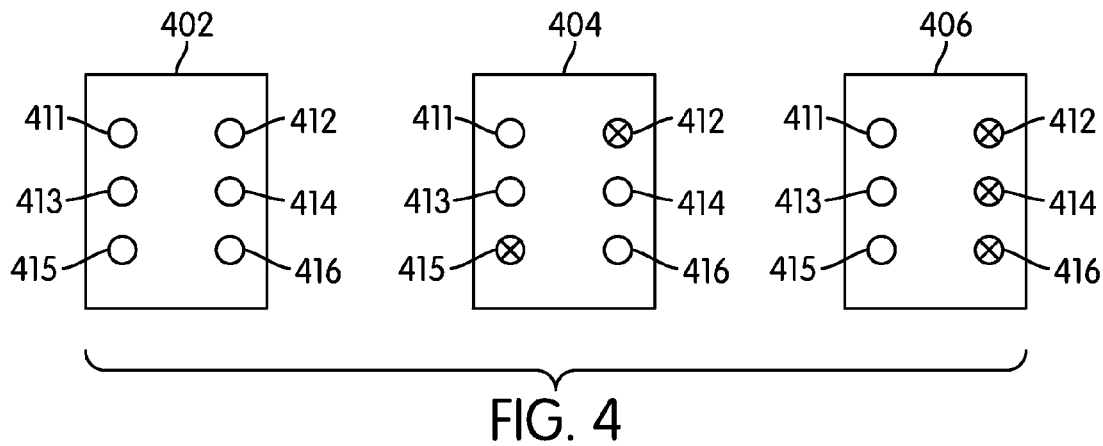
FIG. 4 is a top down view of an exemplary embodiment of multiple engine displacement modes.

Referring to FIG. 4, engine 100 may include provisions for cylinder deactivation in order to modify the engine displacement and thereby increase fuel efficiency in situations where load demands do not require all cylinders to be operating. Cylinder deactivation occurs whenever one or more cylinders within engine 100 are not used. In some embodiments, there may be more than one mode of cylinder deactivation.

Referring to FIG. 4, engine 100 may be operated in maximum cylinder mode 402, intermediate cylinder mode 404 or minimum cylinder mode 406. In some embodiments, maximum cylinder mode 402 operates using the maximum number of cylinders, minimum cylinder mode 406 operates using some number of cylinders less than the maximum number, and intermediate cylinder mode 404 operates using some number of cylinders between the maximum and minimum number of cylinders. Any cylinder mode using less than the maximum number of cylinders may be referred to as a 'deactivated cylinder mode'.

In this exemplary embodiment, during maximum cylinder mode 402, first cylinder 411, second cylinder 412, third cylinder 413, fourth cylinder 414, fifth cylinder 415 and sixth cylinder 416 are all operating. During intermediate cylinder mode 404, first cylinder 411, third cylinder 413, fourth cylinder 414 and sixth cylinder 416 remain operating, while cylinders second cylinder 412 and fifth cylinder 415 are deactivated. Finally, during minimum cylinder mode 406, first cylinder 411, third cylinder 413 and fifth cylinder 415 remain operating while second cylinder 412, fourth cylinder 414 and sixth cylinder 416 are deactivated. In other words, in this exemplary embodiment, maximum cylinder mode 402 is a six cylinder mode, intermediate cylinder 404 mode is a four cylinder mode and minimum cylinder mode 406 is a three cylinder mode. However, in other embodiments, each cylinder mode may use a different number of cylinders during operation.

Generally, engine 100 may switch between maximum, intermediate and minimum (in this case six, four and three) cylinder modes according to current power demands. For high power demands, engine 100 may be operated in maximum cylinder mode 402. For low power demands, engine 402 may be operated in minimum cylinder mode 406. For intermediate power demands, engine 100 may be operated in intermediate cylinder mode 404.

The configurations described here for cylinder deactivation are exemplary configurations. In particular, both intermediate cylinder mode 404 and minimum cylinder mode 406 include configurations of cylinders that are symmetric. These symmetric configurations will decrease the tendency of engine 100 to be unbalanced during operation. When engines with more than six cylinders are used, various other configurations of cylinder deactivation could also be accommodated.

Figure 5:
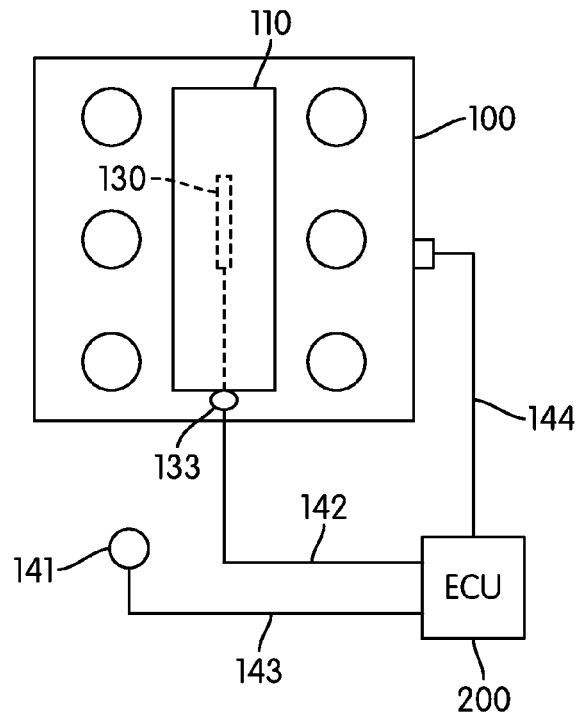
FIG. 5 is a top down view of an exemplary embodiment of an engine and an electronic control unit.

In some embodiments, engine 100 may be associated with a device or system for controlling intake system 101 and for executing various cylinder modes, as well as performing other necessary functions to control engine 100. Referring to FIG. 5, engine 100 may be associated with electronic control unit 200 (hereby referred to as ECU 200). ECU 200 may be configured to control intake system 101. In some embodiments, ECU 200 may open and close valve 130 by actuating solenoid 133 to control intake system 101. In an exemplary embodiment, ECU 200 may be connected to solenoid 133 via first connection 142. Additionally, ECU 200 may be further associated with an engine speed sensor 141. In an exemplary embodiment, ECU 200 may be connected to engine speed sensor 141 via second connection 143. Connections 142 and 143 may be any type of connection, including electrical wires or wireless connections.

In some embodiments, ECU 200 also includes provisions for communicating with one or more additional components of engine 100. In an exemplary embodiment, ECU 200 is connected to engine 100 via third connection 144. Using third connection 144, ECU 200 may send and receive signals from engine 100. For example, third connection 144 may be used to send and receive signals related to fuel injection quantities or fuel injection timing to fuel injectors associated with each cylinder of engine 100. Generally, third connection 144 may be a plurality of connections, each individual connection being associated with some particular part of the engine. As with connections 142 and 143, third connection 144 may comprise one or more electrical wires or wireless connections.

With this arrangement, ECU 200 may control engine 100, including intake system 101. Additionally, ECU 200 may be configured to monitor current power demands and facilitate switching engine 100 between the minimum, intermediate and maximum cylinder modes 406, 404 and 402, according to these power demands.

Traditionally, an intake system is tuned assuming that the engine is operating with a full number of cylinders. When multiple cylinder modes are introduced, the changes in the vibrations of engine 100 due to different cylinder configurations may modify the resonances within the intake system. This generally modifies the volume efficiency of the engine. In some cases, for example, it may be better to maintain a short intake runner length within the intake system for both low and high speeds when the engine is operating with some deactivated cylinders.

Throughout the remainder of this detailed description and in the Figures, the cylinder modes of the current embodiment are assumed to be a six cylinder mode, a four cylinder mode and a three cylinder mode. However, as previously discussed, in other embodiments different numbers of cylinders could be used. Furthermore, in some embodiments, only two cylinder modes could be used. Also, more than three cylinder modes could be used in some embodiments.

Figure 6:
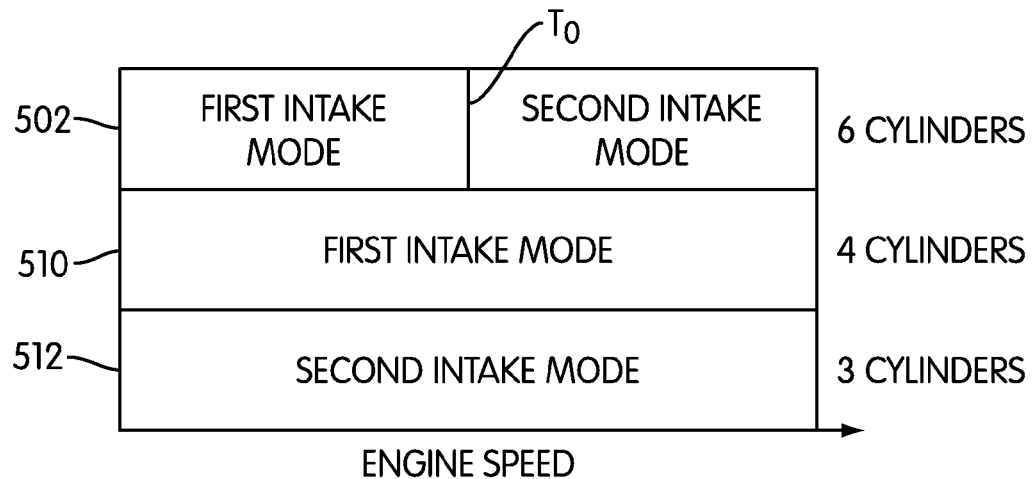
FIG. 6 is an exemplary embodiment of a relationship between intake modes and engine speed for multiple engine displacement modes.

FIG. 6 is an exemplary embodiment illustrating the relationship between various configurations of intake system 101 and engine speed, for various cylinder modes. When engine 100 is in the six cylinder mode, the relationship between the exemplary configuration for intake system 101 and engine speed is shown as first bar 502. In this case, whenever the engine speed is below threshold speed T0, intake system 101 should be operated in the first intake mode. The first intake mode may be associated with valve 130 being closed, which effectively shortens the runner length of intake system 101. Likewise, whenever the engine speed is above threshold speed T0, intake system 101 should be operated in the second intake mode. The second intake mode may be associated with valve 130 being open, which effectively increases the runner length of intake system 101.

When engine 100 is in the four cylinder mode, according to second bar 510, intake system 101 should be operated in the first intake mode, regardless of engine speed. In other words, valve 130 should be closed for all speeds. On the other hand, when engine 100 is in the three cylinder mode, according to third bar 512, intake system 101 should be operated in the second intake mode. In other words, valve 130 should be open for all speeds.

In some embodiments, the relationships discussed with respect to FIG. 6 are configured to allow engine 100 to achieve maximum torque for all engine speeds and cylinder modes. These relationships are shown only as examples, and it should be understood that in other embodiments, the relationship between configurations of intake system 101 and engine speed may vary for each cylinder mode.

During use of the motor vehicle associated with engine 100, ECU 200 may function to control intake system 101 automatically. The following processes, shown in FIGS. 7 and 8, may be performed by ECU 200. In some embodiments, however, other systems and/or devices could be configured to facilitate control of intake system 101.

Figure 7:
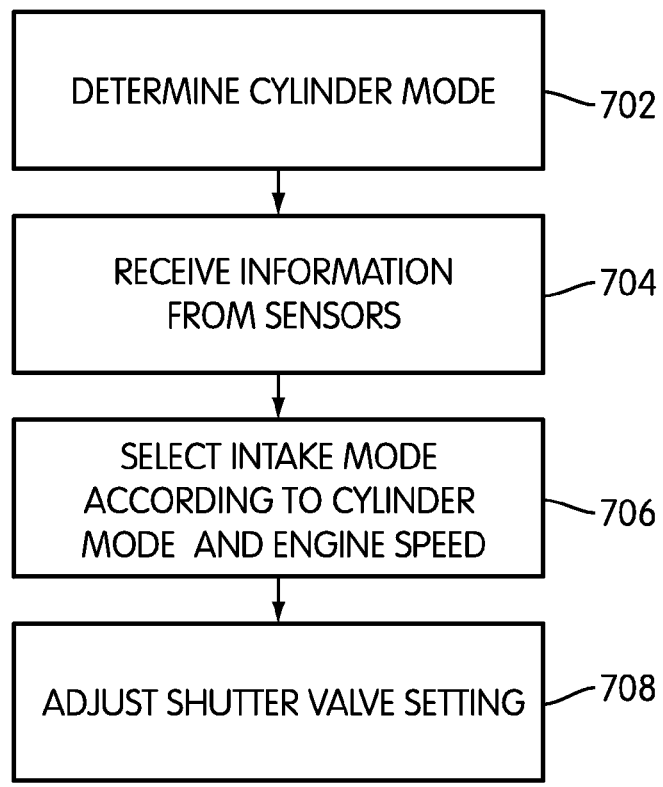
FIG. 7 is an exemplary embodiment of a process for controlling an intake system.

FIG. 7 is an exemplary embodiment of a process for controlling intake system 101. During a first step 702, ECU 200 may determine the current cylinder mode. In some embodiments, ECU 200 may receive input from a sensor associated with the current cylinder mode. In an exemplary embodiment, ECU 200 controls the cylinder mode and therefore the current cylinder mode is already stored in memory. Next, during a second step 704, ECU 200 may receive information from one or more sensors. In some embodiments, during second step 704, ECU 200 may receive information from engine speed sensor 141. This step may be achieved by a signal that is sent from engine speed sensor 141 to ECU 200 via second connection 143. Following this, during a third step 706, ECU 200 may select an intake mode associated with intake system 101 according to the current cylinder mode and the current engine speed. Finally, during a fourth step 708, ECU 200 may submit a signal to solenoid 133, via connection 142, to adjust valve 130 to an open or closed position, according to the selected intake mode.

Figure 8:
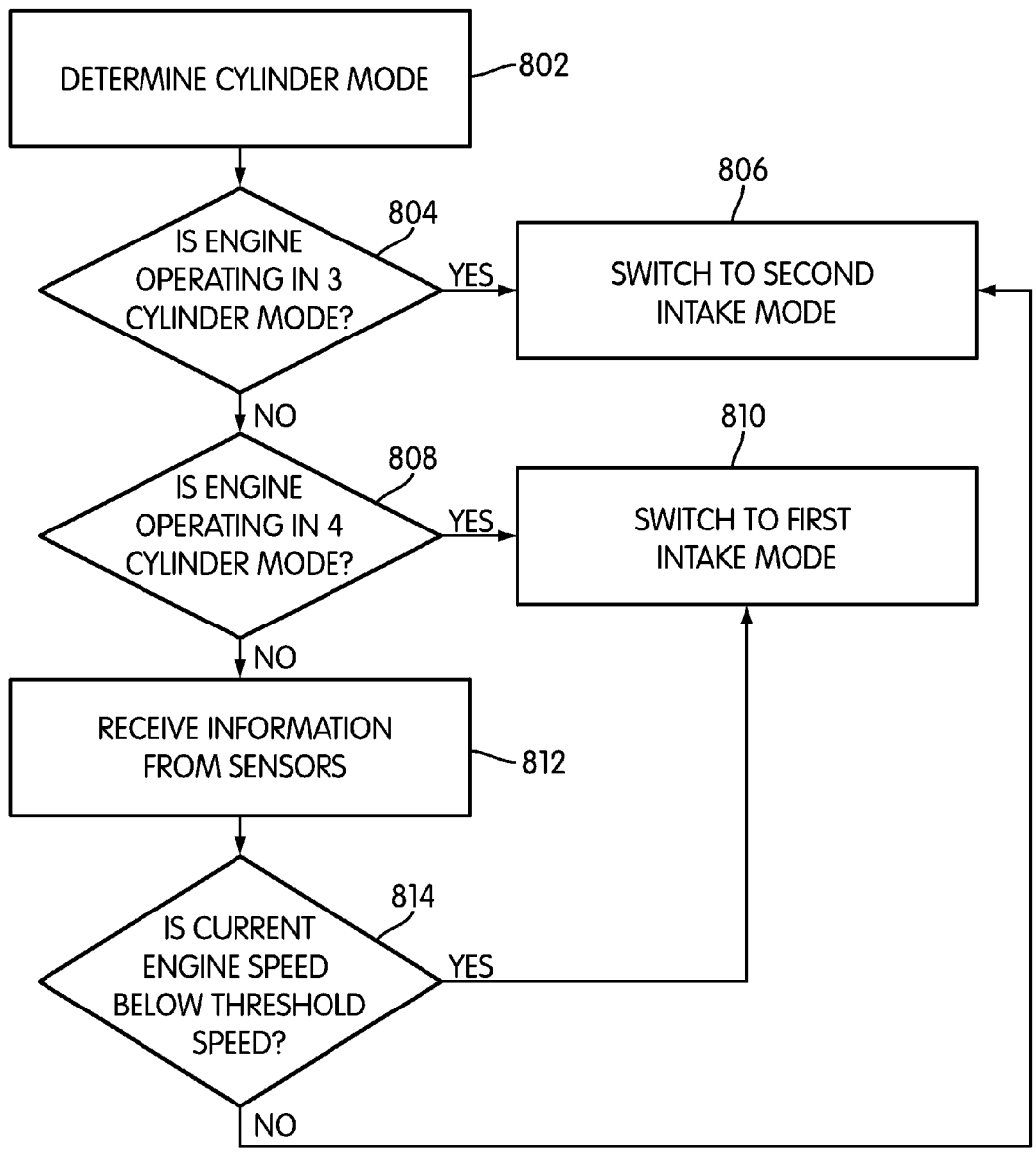
FIG. 8 is an exemplary embodiment of a detailed process for controlling an intake system.

FIG. 8 is an exemplary embodiment of a detailed process for controlling intake system 101. The process discussed here is intended to clearly illustrate many of the details and subprocesses associated with the general process discussed with respect to the process illustrated in FIG. 7. As previously noted, the steps of the following process may be performed by ECU 200.

During step 802, ECU 200 determines the current cylinder mode, as discussed in the previous process. Following step 802, ECU 200 proceeds to step 804 to determine if engine 100 is operating in three cylinder mode. If engine 100 is operating in three cylinder mode, ECU 200 proceeds to step 806. During step 806, ECU 200 sends a signal to solenoid 133 to open valve 130, thus operating intake system 101 in the second intake mode.

If, during step 804, ECU 200 determines that engine 100 is not operating in the three cylinder mode, ECU 200 proceeds to step 808. During step 808, ECU 200 determines if engine 100 is operating in the four cylinder mode. If the answer is yes, ECU 200 proceeds to step 810. During step 810, ECU 200 sends a signal to solenoid 133 to close valve 130, thus operating intake system 101 in the first operating mode.

If, during step 808, ECU 200 determines that engine 100 is not operating in the four cylinder mode, ECU 200 proceeds to step 812. It is now obvious that engine 100 is operating in the six cylinder mode. At step 812, ECU 200 may receive information from one or more sensors. In some embodiments, ECU 200 receives information related to the engine speed. This may be achieved by a signal sent from engine speed sensor 141 to ECU 200 via second connection 143. From this information, ECU 200 may determine the current engine speed. After step 812, ECU 200 may proceed to step 814.

During step 814, ECU 200 may compare the current engine speed with a threshold speed stored in memory associated with ECU 200. In the current embodiment, threshold speed T0 is around 3000 RPM, however, in other embodiments, threshold speed T0 could be any predetermined speed. If the current speed is below the threshold speed, ECU 200 may proceed to step 810 where ECU 200 closes valve 130. If the current speed is above the threshold speed (in some cases, greater than or equal to the threshold speed), ECU 200 may proceed to step 806 where ECU 200 opens valve 130.

Figure 9:
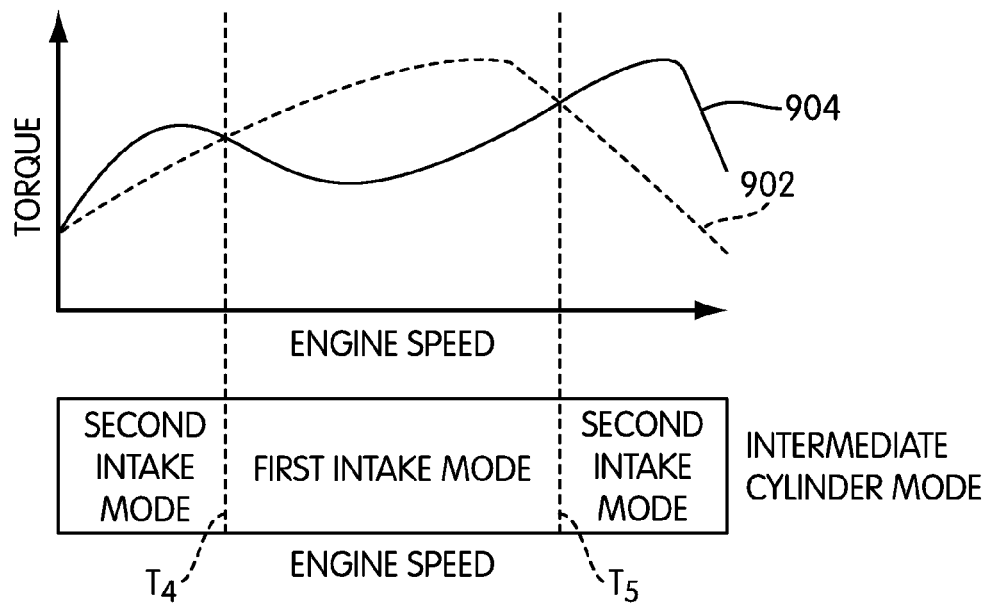
FIG. 9 is an exemplary embodiment of a relationship between torque, engine speed and intake modes of an intake system.

In another embodiment, different intake modes may be associated with a range of engine speeds, rather than a single threshold engine speed. FIG. 9 is an exemplary embodiment of a relationship showing torque as a function of engine speed for the first intake mode and the second intake mode when the engine is operating in an intermediate cylinder mode. The intermediate cylinder mode can be any mode including one cylinder mode, two cylinder mode, three cylinder mode, four cylinder mode or five cylinder mode, as well as any other cylinder mode. Furthermore, it will be understood that in other embodiments, different intake modes may be associated with a range of engine speeds during a full cylinder mode as well.

In this embodiment, first curve 902 is associated with the torque provided as a function of engine speed using the first intake mode. Second curve 904 is associated with the torque provided as a function of engine speed using the second intake mode. As seen by comparing first curve 902 with second curve 904, when the engine speed is below transitional value T4, there is more torque available when the second intake mode is used. Also, when the engine speed is between transitional value T4 and transitional value T5 there is more torque available when the first intake mode is used. Finally, when the engine speed is above transitional value T5, there is more torque available when the second intake mode is used.

The relationships shown in FIG. 9 are generally dependent on resonance effects within intake system 101 when engine 100 operates in a particular intermediate cylinder mode. Therefore, different engines may include different resonance effects and will therefore have different relationships between torque and engine speed. In particular, transitional values T4 and T5 could be any values, and in some embodiments, more than one range could be defined by including additional transitional values.

Figure 10:
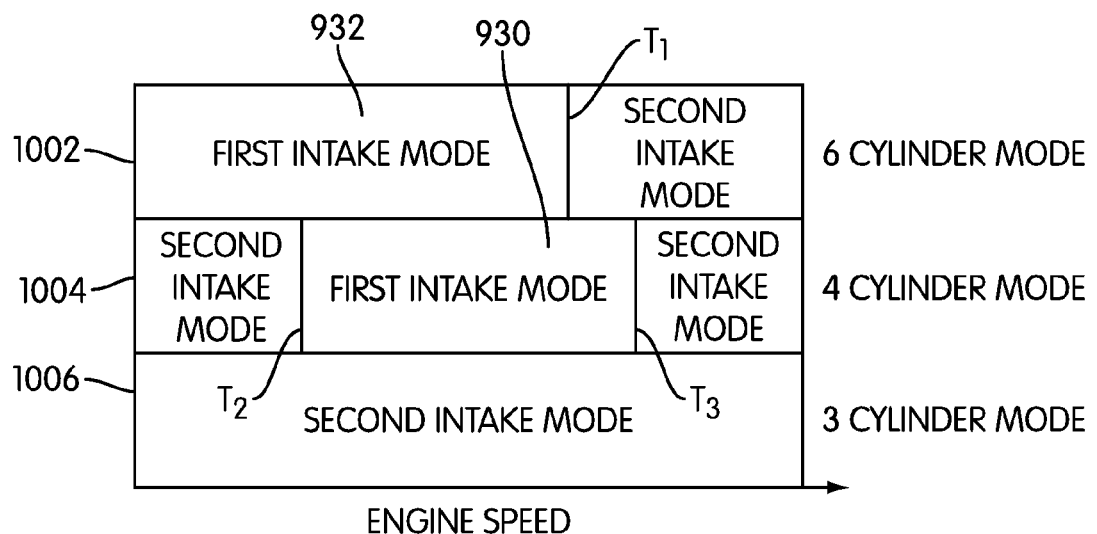
FIG. 10 is an exemplary embodiment of a relationship between intake modes and engine speed for multiple engine displacement modes.

FIG. 10 is an exemplary embodiment of the intake mode over various engine speeds for each cylinder mode. According to this exemplary relationship, during six cylinder mode, the first intake mode should be used whenever the engine speed is less than transitional value T1 and the second intake mode should be used whenever the engine speed is greater than (or equal to) transitional value T1. This is indicated at first bar 1002. In this embodiment, different intake modes are associated with a range of engine speeds in a similar manner to the example discussed in FIG. 9. During a four cylinder mode, the second intake mode should be used when the engine speed is less than second transition value T2 or when the engine speed is greater than third transition value T3. Also, the first intake mode should be used when the engine speed is in the range between transition value T2 and transition value T3. Finally, during three cylinder mode, the second intake mode should be used for all speeds. This is indicated at third bar 1006. As with the previous embodiments, the first intake mode is achieved in the current embodiment by closing valve 130, thus restricting airflow between left cavity 114 and right cavity 116 (see FIGS. 2 and 3). Likewise, the second intake mode is achieved by opening valve 130, thus allowing airflow between left cavity 114 and right cavity 116.

Figure 11:
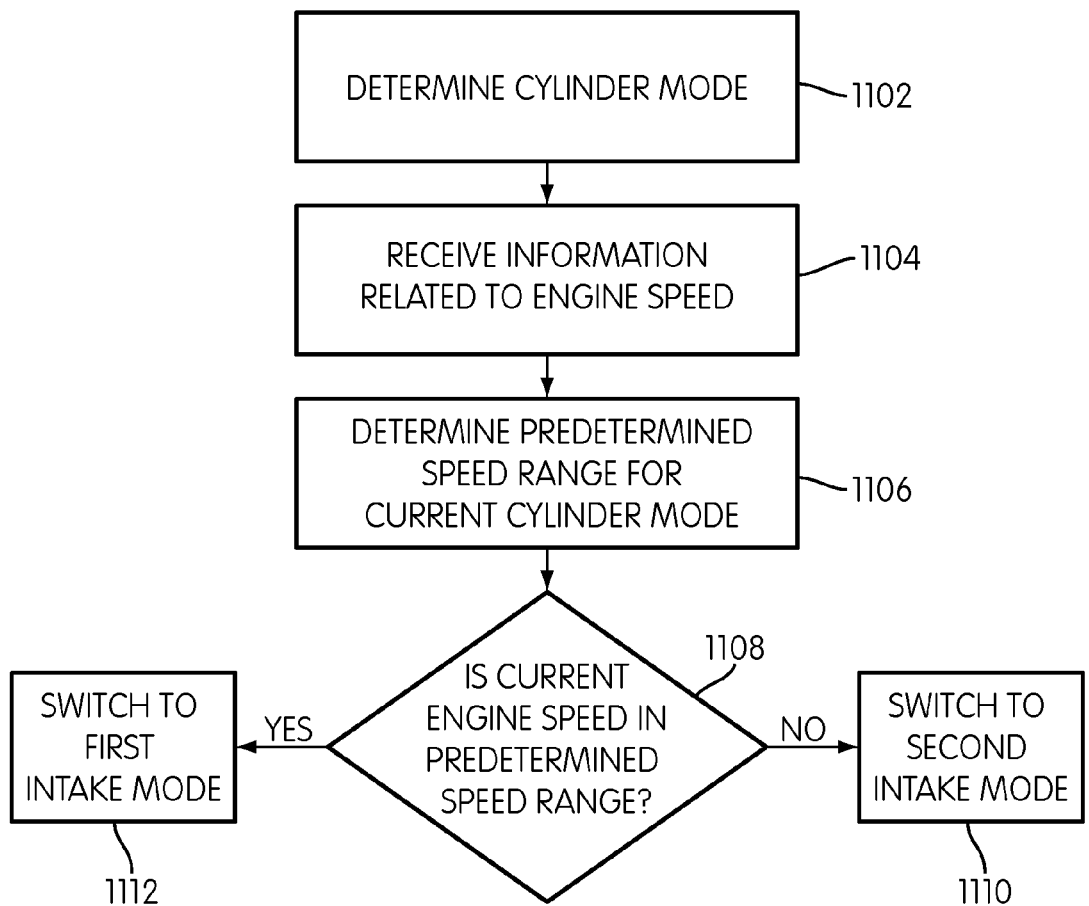
FIG. 11 is an exemplary embodiment of a process for controlling an intake system.

FIG. 11 is an exemplary embodiment of a process for controlling intake system 101 associated with the relationship illustrated in FIG. 10. During a first step 1102, ECU 200 determines the current cylinder mode. Following this, ECU 200 may proceed to step 1104. During step 1104, ECU 200 may receive information from engine speed sensor 141 in order to determine the current engine speed. Next, during step 1106, ECU 200 determines a predetermined range associated with the current cylinder mode.

In the current embodiment, the predetermined range is associated with a range of speeds over which the first intake mode should be used. If engine 100 is in the four cylinder mode, for example, the predetermined range could be range 930 that includes the range of engine speeds between transition values T2 and T3. If engine 100 is in the six cylinder mode, the predetermined range could be range 932 that includes the range of engine speeds below transition value T1. If engine 100 is in the three cylinder mode, the predetermined range would be empty.

Following step 1106, ECU 200 may proceed to step 1108 to determine if the current engine speed is within the predetermined speed range. If the current speed is not within the predetermined range, ECU 200 proceeds to step 1110. During step 1110, ECU 200 operates intake system 101 in the second intake mode by opening valve 130. If, during step 1108, the current engine speed is within the predetermined range, ECU 200 proceeds to step 1112. During step 1112, ECU 200 operates intake system 101 in the first intake mode by closing valve 130. As previously discussed, in some cases the predetermine range may be empty, as when engine 100 is the three cylinder mode, according to the relationship seen in FIG. 10. In this case, regardless of the current speed, engine 100 operates intake system 101 in the second intake mode.

Using the processes described above, intake system 101 can be used in order to increase volumetric efficiency at various engine speeds and for different cylinder modes. This arrangement helps provide additional torque with engine 100. This system is advantageous over prior art systems that do not consider effects of different cylinder modes on resonances associated with various intake modes, and therefore cannot achieve increased volumetric efficiency for all cylinder modes.

In some cases, the methods discussed in this detailed description could be modified to apply to intake systems including continuously variable runner lengths. Examples of systems incorporating continuously variable runner lengths can be found in the art.

Figure 12:
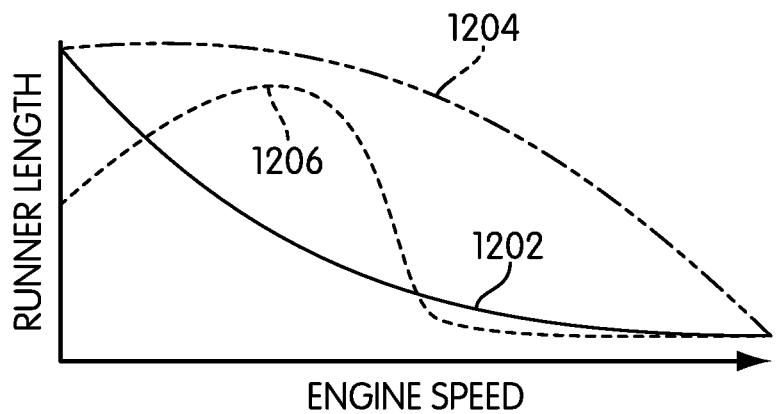
FIG. 12 is an exemplary embodiment of a relationship between runner length and engine speed.

FIG. 12 is an exemplary embodiment of a relationship between runner length within an intake system and engine speed for various cylinder modes. Curves 1202, 1204 and 1206 illustrate exemplary runner length values as a function of engine speed for six, four and three cylinder modes, respectively. These exemplary runner lengths are used to achieve a maximum amount of torque due to increased volume efficiency.

Figure 13:
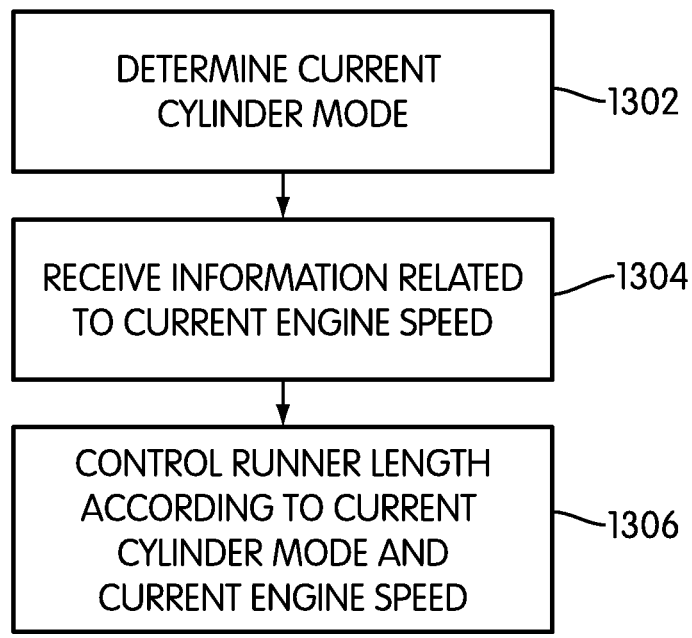
FIG. 13 is an exemplary embodiment of a process for controlling an intake system.

FIG. 13 is an exemplary embodiment of a general process for controlling an intake system that is configured with variable runner lengths. During first step 1302, ECU 200 determines the current cylinder mode. Next, during second step 1304, ECU 200 receives information related to the current engine speed. This information may come from an engine speed sensor, as has been previously discussed. Finally, during a third step 1306, ECU 200 controls the runner length according to the current cylinder mode and the current engine speed. Presumably this decision is made by consulting a look-up table or similar provision that includes the information displayed in FIG. 12.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method for controlling an intake system in a motor vehicle comprising the steps of:
   determining a current cylinder mode from a plurality of cylinder modes;

receiving information related to a parameter associated with an operating condition of the motor vehicle unrelated to the plurality of cylinder modes;

selecting a predetermined range associated with the current cylinder mode, the predetermined range being a range of values over which a first intake mode should be used;

comparing the parameter with the predetermined range, the predetermined range having a lower limit and an upper limit; and within the current cylinder mode, using the first intake mode when the parameter is within the predetermined range and using a second intake mode when the parameter is outside the predetermined range, wherein the first intake mode is a first configuration of the intake system that is tuned for particular resonances of pressure waves when the parameter is within the predetermined range.

2. The method according to claim 1, wherein the parameter is engine speed.

3. The method according to claim 2, wherein the first intake mode is tuned for a first set of resonances.

4. The method according to claim 3, wherein the second intake mode is a second configuration of the intake system that is tuned for particular resonances of pressure waves when the parameter is outside the predetermined range.

5. The method according to claim 4, wherein the first intake mode is associated with a first effective intake runner length that is less than a second effective intake runner length associated with the second intake mode.

6. The method according to claim 1, wherein the predetermined range includes all engine speeds.

7. The method according to claim 1, wherein the predetermined range includes no engine speeds.

8. The method according to claim 1, wherein an ECU switches between the first intake mode and the second intake mode by opening and closing a valve.

9. A method for controlling an intake system in a motor vehicle comprising the steps of:

determining a current cylinder mode;

receiving information related to a parameter associated with an operating condition of the motor vehicle; and within the current cylinder mode, selecting an intake mode for the intake system according to the current cylinder mode and the value of the parameter;

wherein the intake mode is a configuration of the intake system that is tuned for particular resonances of pressure waves associated with the value of the parameter, and wherein the step of selecting an intake mode is performed after the steps of determining the current cylinder mode and receiving information related to a parameter, and wherein said steps of determining the current cylinder mode and receiving information related to a parameter may be performed in any order.

10. The method according to claim 9, wherein the parameter is engine speed.

11. The method according to claim 9, wherein the intake system includes a plurality of intake modes.

12. The method according to claim 11, wherein the intake system includes a set of continuously varying intake modes.

13. The method according to claim 12, wherein each intake mode from the set of continuously varying intake modes is associated with a distinct intake runner length.

14. A method for operating an intake system in a motor vehicle comprising the steps of:

determining a current cylinder mode, wherein the cylinder mode is related to the number of deactivated cylinders;

within the current cylinder mode, using the current cylinder mode and another parameter associated with an operating condition of the motor vehicle to determine an intake mode associated with the intake system, wherein the intake mode is a configuration of the intake system that is tuned for particular resonances of pressure waves associated with the value of the parameter; and operating the intake system using the intake mode associated with the operating condition of the motor vehicle.

15. The method according to claim 14, wherein the parameter is engine speed.

16. The method according to claim 14, wherein the intake system includes a first intake mode and a second intake mode, the method further comprising a first cylinder mode and a second cylinder mode, wherein the first cylinder mode includes a greater number of active cylinders than the second cylinder mode;

the first cylinder mode having a first predetermined range over which the motor vehicle operates using the first intake mode;

the second cylinder mode having a second predetermined range over which the vehicle operates using the first intake mode;

wherein the first predetermined range is different than the second predetermined range.

17. The method according to claim 16, wherein the first intake mode is associated with a first effective intake runner length.

18. The method according to claim 17, wherein the second intake mode is associated with a second effective intake runner length.

19. The method according to claim 18, wherein the first effective intake runner length is shorter than the second effective intake runner length.

20. The method according to claim 16, wherein the first intake mode is selected over the second intake mode if the first intake mode has a greater volumetric efficiency than the second intake mode at a current engine operating condition; and wherein the second intake mode is selected over the first intake mode if the second intake mode has a greater volumetric efficiency than the first intake mode at the current engine operating condition.

* * * * *